United States Patent [19]

Yoshizawa et al.

[11] 4,135,961
[45] Jan. 23, 1979

[54] METHOD OF MOLDING A SOCKET PART ON A SYNTHETIC RESINOUS PIPE END

[75] Inventors: Tadao Yoshizawa; Masayuki Sakaguchi, both of Sakai, Japan

[73] Assignee: Kubota, Ltd., Osaka, Japan

[21] Appl. No.: 718,382

[22] Filed: Aug. 27, 1976

[30] Foreign Application Priority Data

Aug. 30, 1975 [JP] Japan ............................... 50-105542
Nov. 11, 1975 [JP] Japan ............................... 50-136113
Mar. 11, 1976 [JP] Japan ............................... 51-26886

[51] Int. Cl.² ............................................. B29D 23/00
[52] U.S. Cl. ............................................. 156/242; 156/294;
156/306; 264/249; 264/296; 264/322; 425/392;
425/DIG. 218
[58] Field of Search ............... 264/322, 320, 314, 296,
264/249; 425/392, 393, DIG. 215; 156/242,
294, 306, 322

[56] References Cited

U.S. PATENT DOCUMENTS

| Re. 27,736 | 8/1973 | Muhlner | 264/249 X |
|---|---|---|---|
| 2,446,281 | 8/1948 | Harding | 426/393 X |
| 2,865,079 | 12/1958 | Marchiolo | 264/314 |
| 2,962,408 | 11/1960 | Fourmanoit | 264/249 X |
| 3,807,027 | 4/1974 | Heisler | 425/392 X |
| 3,836,622 | 9/1974 | Sporre | 264/249 |
| 3,887,992 | 6/1975 | Parmann | 264/249 X |
| 3,924,999 | 12/1975 | Harris | 425/392 |
| 3,929,958 | 12/1975 | Parmann | 264/249 X |
| 3,940,227 | 2/1976 | Strasser | 425/392 |
| 4,030,872 | 6/1977 | Parmann | 425/393 |

FOREIGN PATENT DOCUMENTS

108626  1974 Japan ............................................ 264/249

*Primary Examiner*—Thomas P. Pavelko
*Attorney, Agent, or Firm*—Oblon, Fisher, Spivak, McClelland & Maier

[57] ABSTRACT

A method of molding a socket part on a synthetic resinous pipe end is disclosed. The socket part is for use in the connection of synthetic resinous pipes and is provided with a filler ring for filling a space created by a spigot pipe end, the inclined surface at the interior of the socket part, and a virtual inner surface formed by the two connected pipes. In addition, the filler ring fulfills a function in the capacity of a stopper which regulates the insertion length of the spigot pipe. For the purpose of its being retained in the socket part, the filler ring to be employed should have its external diameter be slightly larger than the internal diameter of the part which has been molded as the socket part, and is held through the medium of a holding means which is maintained concentrically with the core mold. On the other hand, the core mold is arranged correctly in alignment with the pipe which is to be molded at one end in the socket part, by jointly using a centering guide means for the inserted pipe, if necessary, in company with the core mold. The arrangement of the filler ring should be synchronized with the molding of the socket part, thus the filler ring being able to remain in the exact position of the socket part on removing the core mold at the conclusion of one operation cycle.

13 Claims, 36 Drawing Figures

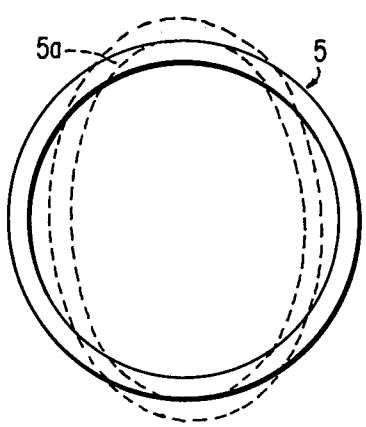
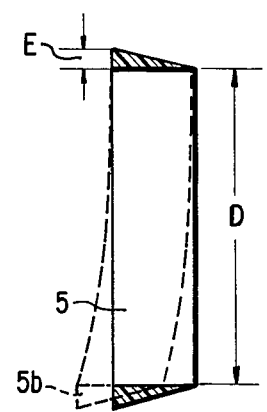
FIG.4A  FIG.4B
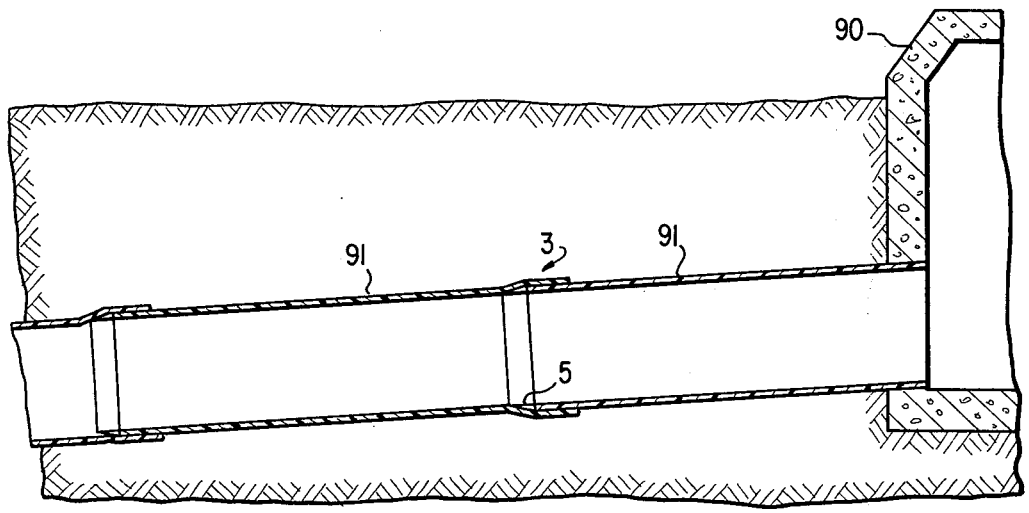
FIG.5
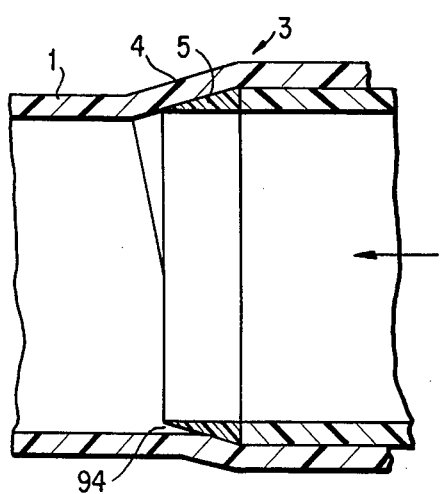
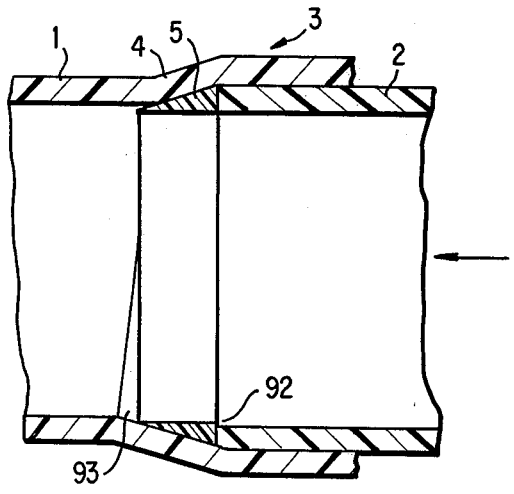
FIG.6  FIG.7

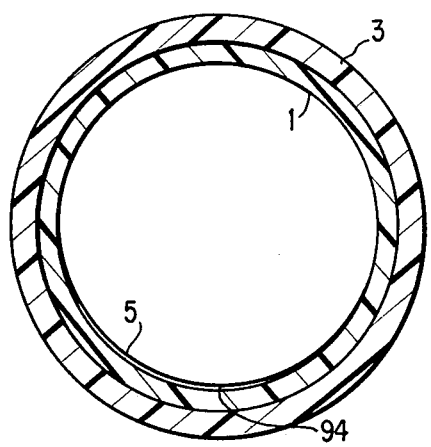
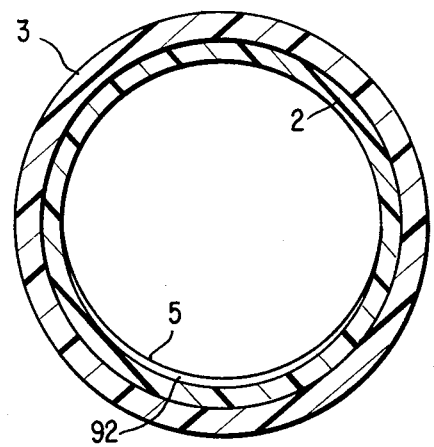
FIG.8  FIG.9
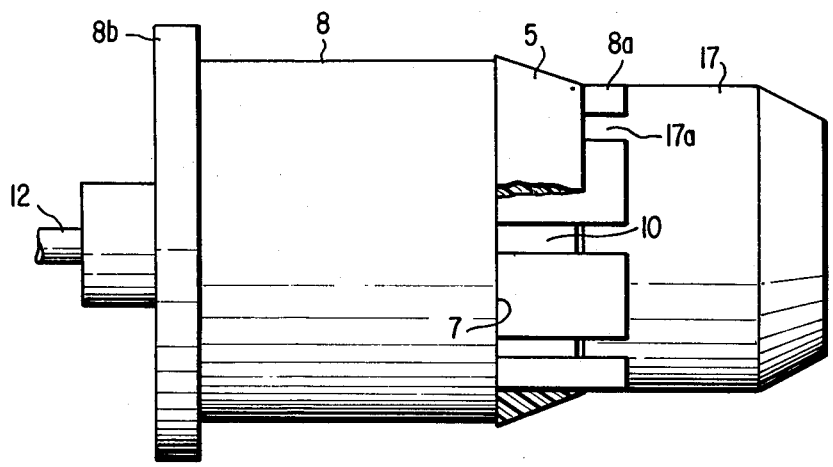
FIG.10
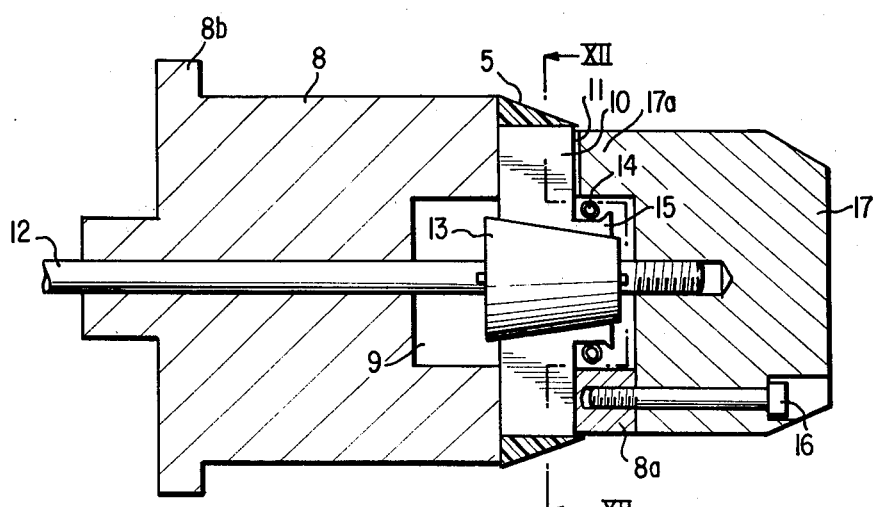
FIG.11

METHOD OF MOLDING A SOCKET PART ON A SYNTHETIC RESINOUS PIPE END

BACKGROUND OF THE INVENTION

1. Field of the Invention

Synthetic resinous pipes are generally manufactured with the method of extrusion molding and have for the most part a definite external diameter. In laying such pipes, varieties of connecting means are applied depending on the requirements of the connecting parts used therein. There are instances, of course, when a particular kind of or a special-made pipe joint is employed. However, in ordinary circumstances, a spigot pipe is inserted into a socket part of the other pipe which is secondarily formed at its one end, by taking advantage of the thermoplasticity of synthetic resinous material. As it is, since a socket part must be of larger diameter as compared with the main body of the pipe, accordingly an inclined part is to be inevitably produced at the interior of the socket part, and a space is left in the interior of this inclined part after the spigot pipe has been inserted therein. This space is liable to bring about the accumulation of inclusions or impurities present in the fluid when it is of low pressure such as in the sewer system use, and be accompanied by a disagreeable increase in the flow resistance of the fluid. While, in case of a high pressure fluid such as in a water supply system, turbulence is produced in it, causing water hammer, or the like, and exerting a bad influence on the pipe line. What is worse, at the very time of connecting synthetic resinous pipes, the ignorance of the exact insertion length of the spigot pipe before the connecting operation sometimes leads to damage of the spigot pipe end, or results in the breakage of the forcibly pushed socket part under the heavy load applied to the inclined surface thereof. In order to correct these flaws and to predetermine the insertion length of the spigot pipe, the provision in the interior of the socket part of some kind of a corbel piece is necessitated. This consideration has resulted in the provision in the interior of the socket part with a so-called filler ring which serves to plug up the aforenoted space and at the same time regulate the position of the tip of the spigot pipe. This proposal, in fact, has been already applied in practice. In the case of using only such an arrangement, however, the pipe to be formed which is inserted was not always located in the proper position, or, if it was properly located, the filler ring could not be held on the socket part for a long period of time and was readily broken away therefrom by impact and shock applied to the filler ring.

2. Description of the Prior Art

The arranging means for such a type of filler ring with which we had been working heretofore were the following: a means of arranging the filler ring on the interior of the socket part through the aid of some adhesives after the formation of the socket part, or a means of arranging on the socket part of the filler ring fixed in advance on the core mold which is to form the socket part, synchronously with the formation thereof. Yet, the one with which the filler ring is set after the formation of the socket part can be applied only to the special case of large diameter synthetic resinous pipes and is not available for the socket part which is made in a mass production system. Also, the thus planted filler ring has a weak point so as to be readily moved out of place by an insignificant shock. For such problems, there is popularly utilized the other means with which the filler ring is firstly fixed on the core mold and is then applied to the socket part concurrently with the formation thereof. Nevertheless, since these setting means were no more than simple ones wherein the filler ring had only to be arranged on a prescribed position along the external circumference of the core mold called a "tamper mold", the center of the filler ring sometimes did not coincide with that of the core mold, if there was an irregularity at the circumferential edge of the filler ring. As a result, it often occurred that the filler ring which was planted in the socket part was not concentric with the socket part, and more, there was also the fault that a gap was produced between the filler ring and the inner surface of the socket part, if the filler ring was not perfectly round in regard to its forming accuracy, subsequent to which the filler ring becomes inoperative.

Be that as it may, the extrusion-molded pipe in general is characterized by a fixed size of its external diameter, but it has a flaw of fluctuating in a certain range with respect to its internal diameter. Accordingly, it is common knowledge that the core mold which is used for the secondary molding of the extrusion-molded pipe is provided with a guide section for the sake of the external diameter corresponding to the diameter of the pipe of minimum internal diameter, with the view to the easy insertion into any pipe in the above-mentioned range. In the case of the previously stated core mold for use in loading the filler ring, the external diameter of its guide section was nearly the same as the minimum internal diameter of the inserted pipe. In the case of loading the filler ring, if it was smaller as compared with the internal diameter of the pipe and consequently was in such a manner as to protrude from the inner wall of the pipe, there occurred the aforementioned sundry troubles so that it required that the internal diameter of the filler ring should have been equal to, or a little larger than, the internal diameter of the pipe of a maximum internal diameter. This is the reason why the dimensioning of each diameter should be in accordance with the following order and relation:

Max. ID of the filler ring > Min. ID of the filler ring
≧

Max. ID of the pipe > Min. ID of the pipe ≧ OD of the core mold, (wherein Max. = maximum, ID = inner diameter, Min. = minimum, and OD = outer diameter)

Under such conditions, there was an advantage that the operation of manually loading the filler ring was easy because of the clearance between the filler ring and the core mold, granting that the filler ring was somewhat deficient in roundness. At the same time, this clearance formed are eccentricity between the filler ring and the core mold, entailing the debasement of the retention of the filler ring, and obstructed the insertion of the pipe because the end of the pipe which was to be formed got caught at the time of its insertion. On the other hand, though the curtailment of the clearance made the eccentricity proportionally less, it became inconvenient to set up the filler ring on the core mold. If also the filler ring might be simply arranged on the interior of the socket part, it was only hung on the surface contacted with the socket part, but was not securely held thereon. As a result, on removing the core mold, the filler ring could not be set in the socket part as the same remained on the core mold, or, if set, it was not tightly secured thereon, and, as a natural consequence, there often occurred the separation of the filler ring out of the socket part on account of the contraction of the synthetic resinous material after the pipe formation or by the vibration and impact during their transportation.

SUMMARY OF THE INVENTION

The present invention has been contrived on the basis of the hitherto circumstances.

It is therefore an object of the present invention to provide a method of molding a socket part on a pipe end in such a manner as to arrange a filler ring which is to be set on the interior of the socket part concentrically with the socket part which is to be formed, so as to retain it securely on the interior of the socket part, and to make it such that it does not protrude into the pipe line.

Another object of the present invention is to provide a holding means which is able to securely hold the filler ring on a core mold for use in the formation of the socket part, thereby enhancing the utility of the core mold in loading the filler ring, facilitating the formation of the socket part, and making possible the production of socket parts excellent in quality.

A further object of the present invention is to provide a method of embedding the filler ring which is even deficient in roundness so as to in effect correct its out-of-roundness.

Still another object of the present invention is to provide a method of uniformly embedding the filler ring on the inner surface of the pipe all about its circumference.

Yet another object of the present invention is to provide a method of arranging the filler ring concentrically with the socket part which is to be formed by using a centering guide means for the inserted pipe jointly with the core mold which is holding the filler ring, and at the same time to provide a centering guide means for such a purpose.

An even further object of the present invention is to provide a means which serves both as the holding means for the filler ring equipped on the core mold and as a holding means for a ring retaining a resilient packing which would be set on the socket part in some cases, thereby simplifying the molding process of the socket part.

Still a further object of the present invention is to provide a means of uniformly loading the filler ring so that solid bodies present in running water may not stagnate at the connected part of drainpipes.

The method according to the present invention which has been able to achieve the above and other objects can be summarized as follows.

As for a filler ring which is to be provided on the interior of the socket part there is employed one whose external diameter at its outer part is larger than the diameter of the finished inner surface of the socket part. The filler ring is so formed that a part of its outer face may be embedded into the wall of the finished socket part. For the purpose of molding the socket part, the filler ring, which is to be loaded on the core mold prior to the formation of the socket part, is allowed to have a proper amount of clearance to make its loading easy, and the core mold is provided with a holding means for the filler ring to load it concentrically with the core mold. This holding means is formed by providing the core mold with a member expansible in the radial direction or a member which shifts and displaces in the centrifugal direction with the object of holding the filler ring concentrically with the core mold. The core mold loaded with the filler ring also includes a forming way in combination with a centering guide means for the inserted pipe which is fixed to the side of the holding part for the filler ring on the core mold so that the inserted pipe may be held in concentric relation with the core mold at the time of insertion. Further, the core mold loaded with the filler ring also contains a construction where a part of the holding member for the filler ring has a form congruent with the back of the filler ring with the view of reducing the resistance of the pipe when it is inserted for the formation. The provision of the retaining ring for the resilient packing on the socket part requires a consideration of jointly using a means by which the retaining ring for the resilient packing may be held in the correct position on the core mold which is provided with the aforesaid holding means for the filler ring.

In the socket part which has been molded with the help of the above-mentioned means, the filler ring was able to be arranged concentrically in the correct position. In addition, the filler ring which was thus arranged was securely retained at the interior of the socket part with no fear of being broken away at all. The insertion and molding of the inserted pipe came to be smoothly performed. As the result has been made practicable, the high-speed molding operation and the production of socket pipes of high quality has been achieved.

BRIEF DESCRIPTION OF THE DRAWINGS

Various other objects, features, and attendant advantages of the present invention will be more fully appreciated as the same becomes better understood from the following detailed description of the present invention when considered in connection with the accompanying drawings, in which:

FIGS. 4A and 4B show respectively a front view and a sectional view of a filler ring, FIG. 5 is a schematic view illustrating sewer pipes laid underground, FIG. 6 is a partly enlarged diagrammatical sectional view of FIG. 5 pointing out its flaws, FIG. 7 is also partly enlarged diagrammatical sectional view of FIG. 5 indicating its defect, FIG. 8 is an end view of FIG. 6, FIG. 9 is an end view of FIG. 7, FIG. 10 is a side view of a core mold constructed in accordance with the present invention wherein a filler ring is shown in a partial cutaway, FIG. 11 is a longitudinal sectional view of FIG. 10.

DETAILED DESCRIPTION OF THE INVENTION

Figure 1:
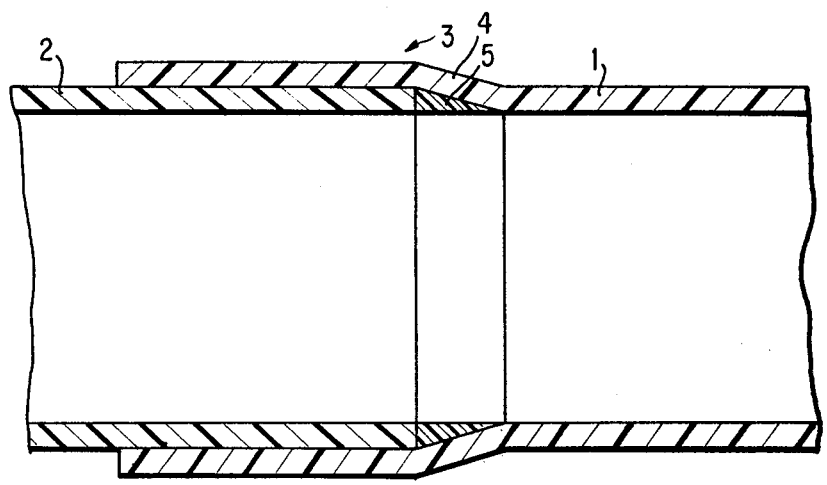
FIG. 1 is a sectional view showing a correct connecting portion hitherto well-known of synthetic resinous pipes.
Figure 2:
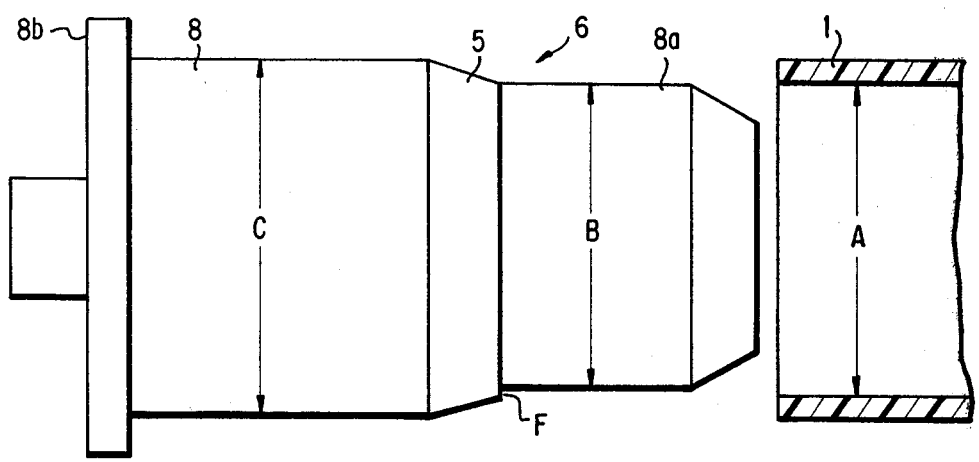
FIG. 2 is a diagrammatical illustration of a core mold for molding a socket part in correlation with a pipe which is to be formed.

The connecting portion of two synthetic resinous pipes is in general constructed as shown in FIG. 1. Whether a pipe 1 may be long or short, the formation of a socket part 3 is required for the connecting operation. This socket part 3 is formed by either pressing the heat-softened pipe end of pipe 1 against a core mold which is prepared in advance so as to be congruent with the inner face of the socket part which is to be formed, or alternatively, by inserting the core mold into the heat-softened pipe end and expanding it. The formed part of the pipe is hardened through natural or positive cooling and then subsequent to the removal of the core mold, the formation of the socket part is completed. The internal diameter of the socket part 3 is formed nearly the same as, or a little larger than, the external diameter of a pipe 2 with which it is to be interconnected. The core mold is made in consideration of the thermal contraction of the synthetic resinous material. On the other hand, when the socket part 3 is molded by employing the above-mentioned core mold, an inclined portion designated by the numeral 4 is formed beyond the socket part 3. When the connecting pipe 2 is inserted into the socket part 3, its tip falls short of this inclined partion 4 so that a space is produced there. In such a space there is likely a stagnate all sorts of impurities or solid bodies present in the sewerage, which may of course narrow the internal diameter of the piping. Otherwise in the case of high pressure fluid flow, such undesirably causes turbulence to occur. The existence of such a space also brings about various sorts of obstacles to a flushing operation of the interior of the piping. When the connecting pipe 2 is inserted into the socket part 3, the insertion length of the pipe 2 must already be known. The reason for this is as follows. Owing to the relatively easy deformation of synthetic resinous pipes, when the top edge of the forcibly inserted connecting pipe 2 impinges against the inside of the inclined section 4, residual stress is created therein thus sometimes leading to damage of the tip of the connecting pipe 2 or breakage of the socket part 3. With the object of reducing such, there is employed a filler ring such as designated by the numeral 5 in FIG. 1. The filler ring 5 is made of the same kind of synthetic resinous material as the inserted pipe, for example, such as polyvinyl chloride resin or of other synthetic resinous material, for example, such as polypropylene, and sometimes, if necessary, of some kind of metal. The representative form of the filler ring 5 is a ring which has a right-angled triangular cross-section, the short leg of which is almost equal to the wall-thickness of the connecting pipe 2 and the oblique side of which corresponds with the inside of the inclined section 4, provided that the form of the filler ring is not necessarily limited to the aforesaid right-angled triangle and it can take any form such as a trapezoid which has two right angles at one side thereof. The filler ring 5 is disposed beyond the socket part 3, namely on the inclined section 4, as shown in FIG. 1, its left end serving as a stopper against the insertion of the connecting pipe 2. Now, in manufacturing the socket part 3 there has been hitherto used a core mold 6 as shown in FIG. 2. This core mold consists of a forming trunk part 8, a guide trunk part 8a for the pipe 1 which is to be formed, and a flange part 8b for limiting the insertion of the tip of the inserted pipe 1. The internal diameter A of the inserted pipe 1 which is to be formed is expected to be uniform when manufactured by extrusion molding but in the manufacture of pipes ordinarily only its external diameter is regulated so that the internal diameter A is not uniform in practice. Therefore a fluctuation of about ±0.5% of the diameter is allowed. From this, the external diameter B of the guide trunk part 8a of the core mold 6 is formed to be almost the same as the allowable minimum diameter of the internal diameter A of the inserted pipe 1, or a little smaller. The external diameter C of the forming trunk part 8 of the core mold 6 is formed nearly the same as, or a little larger than, the external diameter of the inserted pipe 1, and is usually made larger in particular considering the thermal contraction of synthetic resinous material. Prior to the operation, the filler ring 5 is disposed on a boundary step part defined between the forming trunk part 8 and the guide trunk part 8a.

Figure 3:
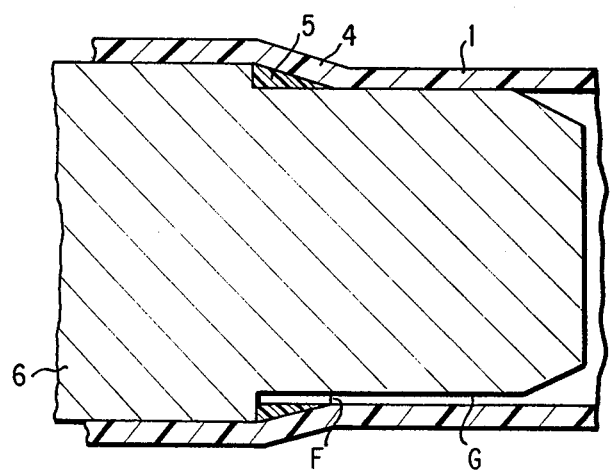
FIG. 3 is a sectional veiw showing the state where the formation of a socket part has been completed, but before the removal of the core mold.

FIG. 3 shows schematically how the filler ring 5 which has been arranged on the core mold 6 is transplanted onto the socket part. Here the filler ring 5 is to be arranged on the bottom of socket part 3, however, no measure has yet been taken in regard to its holding means. That is, the filler ring only sticks with its oblique side to the inner face of the inclined section 4 of the socket part 3. Consequently, the filler ring 5 tends to come off from the arranged position or entirely fall out of the socket part 3 owing to the shrinkage by heat change of synthetic resinous material or due to vibration or an insignificant impact during transportation, thus entailing a delay of the piping work or an accident after the completion of the pipe-laying. Except in a special case, the arrangement of the filler ring 5 is usually accomplished synchronously with the formation of the socket part 3 by using a means in which the filler ring 5 is fit on the socket-part-molding core mold in advance. Accordingly, the core mold 6 and the filler ring 5 must be held in a very correct position and concentrically with respect to each other. As it is, the setting work of the filler ring on the core mold is performed exclusively by hand, as previously stated, so that it is desirable that the filler ring is one that can be quickly handled and has a clearance of some extent. The filler ring 5 is made up of synthetic resinous material, and has a small thickness as shown in A and B of the FIG. 4. Such being the case, the filler ring 5 is warped a trifling extent, as shown by the dotted line, and it cannot keep itself in roundness or in a planar form. Though it is ideal that the internal diameter D of the filler ring 5 coincides with the internal diameter A of the inserted pipe 1, the diameter A fluctuates to some extent, as mentioned above. Further, it is necessary to protect as much as possible the filler ring 5 from protruding into the inside of the pipe. Therefore, the internal diameter D of the filler ring 5 is formed almost the same as the maximum internal diameter within the allowable limits of the internal diameter A of the inserted pipe 1, or a little larger from the point of view of safety. That is why a gap F is inevitably produced between the guide trunk part 8a and the filler ring 5 which is arranged on the core mold 6, as shown in FIG. 3, and another gap G is also formed between the guide trunk part 8a and the internal diameter of the inserted pipe 1. For this reason, the ideal arrangement such as shown in FIG. 1, must be desirable, but no measure hitherto has been taken to achieve and maintain such an excellent result for example, a concentric arrangement, the reason for such being the fact that the gaps F or G are hard to be equalized in a specific direction, which varies depending on the heating uniformity at the time of inserting the pipe, the eccentric displacement of the filler ring, not to speak of the difference of the internal diameter of the inserted pipe, or the like. How these defects appear, for example, at the connecting portion of the piping in the drainage will be hereinafter explained.

FIG. 5 shows the laying state of drainpipes in the sewerage, wherein a drainpipe 91 has the socket part 3 formed at its connecting portion. The socket part 3 is provided with the filler ring 5. The numeral 90 shows a manhole which is connected through the drainpipe 91 to an overflow. As shown in FIGS. 6 and 7, in these connecting portions the filler rings 5 are frequently not correctly arranged on their own socket parts. FIG. 6 shows a case where the center of the filler ring 5 displaces upward in relation to the socket part 3, and FIG. 7 gives an example in which the filler ring 5 displaces downward, and a part of it has protruded into the inserting pipe 2. Waste water flows in the direction of the arrow, but it must be particularly said that there is often a great amount of solid bodies, which tends to be collected at the recess indicated by 94 in FIG. 6, even if subjected to the action of turbulence of the flowing fluid. In FIG. 7, solid bodies are collected at a recess 93 or at a step part 92 so as to be intercepted thereby, in the same way as mentioned above, resulting in the hindrance of the drainage. These recesses or step parts also disturb the flushing operation of the drainpipes. In response to these circumstances great care must be taken. It is necessary to arrange the filler ring 5 on the socket part 3 correctly and concentrically. In contradiction to these requirements stand, it seems, the space creation coming from the clearance for the sake of the setting operation of the filler ring 5 on the core mold or from the variation of the internal diameter of the pipe 1 which is to be formed into the socket part. However, the practical side of manufacturing takes into consideration how to mediate these two opposing requirements. Further, the filler ring which is set on the core mold must be constructed in such a manner as to be left behind on the socket part 3 at the time of removing the core mold. The present invention is so contrived as to meet all these requirements. Namely, pursuant to this invention, the filler ring 5 which is to be employed has an external diameter which is larger than the internal diameter of the socket part which is to be formed, is so made as to be held concentrically with the core mold through the aid of a holding means provided on the core mold, and is arranged correctly in the socket part by the jointly used centering guide means for the inserted pipe, if required. Moreover, according to the present invention, the guide for the insertion of the pipe which is to be formed becomes smooth and means for retaining the ring which securely holds the packing are jointly provided on the core mold for the purpose of the formation of the socket part. A holding means for the filler ring and the centering guide means of the pipe which is to be formed are also novel in accordance with the present invention.

Figure 12:
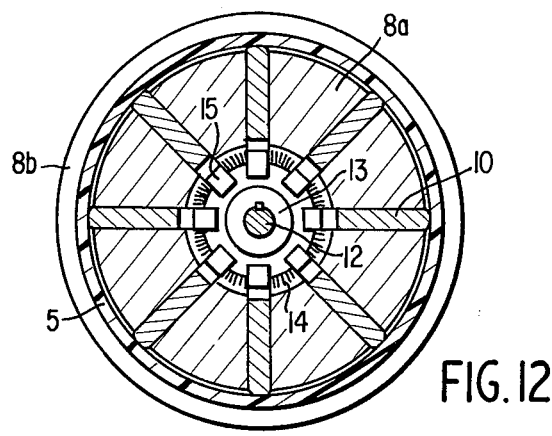
FIG. 12 is a cross-sectional view taken as indicated by the section line XII—XII of FIG. 11, FIGS. 13 to 16 are partially enlarged sectional views illustrating the relations of the pipe wall of the socket part of the filler ring.

FIGS. 10, 11 and 12 show together an example of the core mold which fulfills the above-mentioned requirements. The main body of the core mold consists of the forming trunk part 8 for the socket part and the guide trunk part 8a for the pipe which is to be molded. The numeral 8b is a flange formed on the back end of the forming trunk part 8 and serves as the flange part for the regulation of the insertion extent of the pipe 1 which is to be formed. The guide trunk part 8a of the core mold 6 has the external diameter which is almost the same as, or a little smaller than, the internal diameter of the pipe which is to be formed, thus making possible the pipe 1 to pass thereover. The boundary surface 7 between the forming trunk part 8 and the guide part 8a forms a hitching step part for the filler ring 5. The filler ring 5 which is arranged on the hitching step part 7 is concentrically held through the medium of a holding means. Namely, this holding means is so composed that slide pieces 10 which move out in the radial direction may hold the filler ring 5 by expanding the same from the inner side thereof. In this composition, a cavity 9 is formed in the middle of the front side of the sprocket forming trunk part 8 of the core mold. In this cavity 9 is formed a radial slit corresponding in length to the length of the guide trunk part 8a. On the other hand, on the front side of the guide trunk part 8a is attached a guide cap body designated by the numeral 17 with setting bolts 16. The circumferential surface of the cap body is formed to have an external diameter equal to that of the guide trunk part 8a. On its attached side is formed a plurality of projections 17a which are engaged in the slit 11 formed in the above-mentioned guide trunk part 8a. These projections 17a are formed rather short and form radial slit holes within the arrangement part of the filler ring 5. The numeral 10 are slide pieces provided in these slit holes. Their base surfaces are congruent with the circumferential surface of a truncated conical drum 13 arranged within the cavity 9 and are made up so as to impinge upon the drum 13 at any time. As a means for encouraging the same to impinge, there can be suitably utilized any proper spring, but a most preferable means is that shown in FIG. 12, in which an engaging part 15 is provided on a part of the slide piece 10 and a spring ring 14 is arranged on the engaging part 15 so as to bias the slide piece 10 forward in the central direction. The drum 13 is tightly secured on a slide shaft 12, which can be moved by any appropriate means. As the slide shaft 12 shifts to the right of the figure, all of the slide pieces 10 slide concurrently in the radial direction and hold the filler ring 5. To the contrary, when the slide shaft 12 shifts to the left, it releases the hold of the filler ring 5.

In the meantime, the important matter of the present invention resides in the employment of such a filler ring 5 that has an external diameter a little larger than the internal diameter of the pipe which is to be formed into the socket part. There have been hitherto occassionally noticed, of course, some cases where the filler ring was held eccentrically against the core mold or a part of the top of the filler ring was retained being partially embedded in the pipe wall depending on the insertion state of the pipe which was to be formed, and so forth. These happenings, however, never were achieved on a basis of a somewhat scheduled blueprint. And besides, there was seen some scattering between the embedded and unembedded parts. In the present invention, the engaging means as aforesaid is somewhat arranged all about the circumference of the filler ring which is to be attached to the socket part in order to securely provide the filler ring 5 on the inclined section beyond the socket part. It is concentrically arranged so as not to break away due to some impact as formerly referred to.

Figure 13:
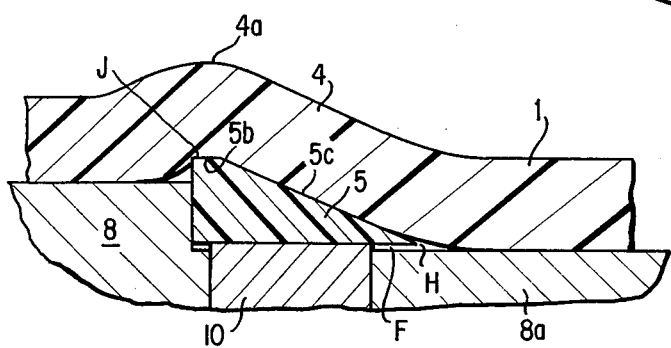
Figure 14:
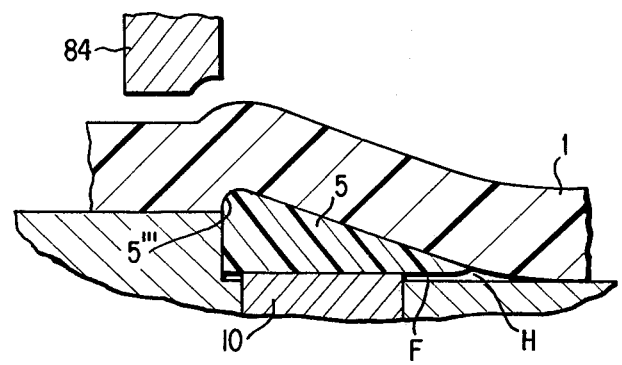
Figure 15:
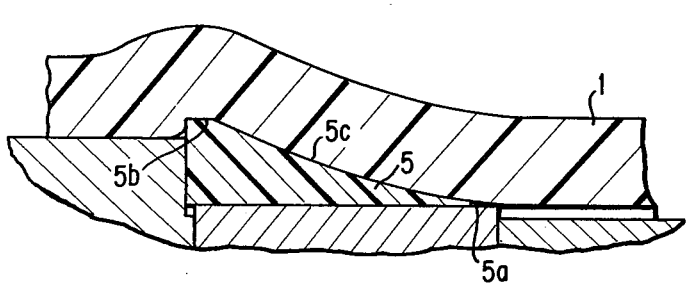
Figure 16:
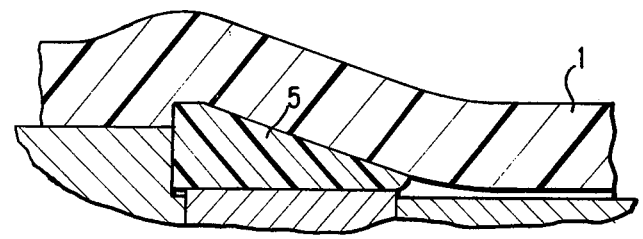

Hereupon, further particulars will be given for the relation of the filler ring 5 to the pipe 1 which is to be formed to have the socket part. FIGS. 13 to 16 are partially enlarged views for the purpose of explaining the above. The cross-section of the filler ring 5 forms normally a substantially right-angled triangle, and its top part 5b is formed to have a planar surface or a circular curved surface. That is because, if it has an acute angle, this acute part becomes a shear stress part of the strain applied to the socket part, thus involving cracks or breakage therein. FIG. 13 shows how the top part 5b of the filler ring 5 is embedded in the wall thickness as mentioned before. That is, the pipe 1, which is to be formed, is softened, then is pushed in along the circumferential wall of the guide trunk part 8a of the core mold and continues along the inclined surface 5c of the filler ring 5. When it passes over the top part 5b, then it shrinks in the central direction by virtue of the contractive elasticity of the synthetic resinous material of which the pipe is made up. This shrinkage is soon regulated by the socket-part forming trunk part 8. It can be seen in the figures that the pipe 1 falls downward up to the outer surface of the forming trunk part 8 at the point (indicated by the letter J in FIG. 13) across the top part 5b of the filler ring 5, while leaving a concave part which retains the filler ring 5 so as not to break away therefrom. In order to ensure this retention, sometimes an outer mold is applied to the external circumference of the above bent part. FIG. 14 shows an instance when the outer mold is used. At such a time it is preferable to make the top part 5b circular-curved. When the outer mold is not used, the external circumferential surface of the part which is provided with the filler ring forms a gentle curved surface 4a, but its outer appearance is regulated by the use of the outer mold such as shown in FIG. 14. The ideal shape of the inclined surface 5c of the filler ring 5 may be such that the same is elongated along a curved line as shown in FIG. 15. The pipe thickness, which is deformed so as to envelop the filler ring while enlarging its own diameter along the inclined surface 5c, forms a gap at the foot part 5a after conclusion of the formation. It is not yet well known whether this gap-forming action is caused by the reaction force by which the wall thickness will displace in the direction of contraction after its having climbed over the filler ring, or if it comes from a tendency which drives the extended internal circumferential surface thereof to initially float and subsequently shrink. At any rate, the upper face of part 5a will not agree with the inner surface of the inclined section 4 of the socket part. In addition, it is not preferable to form the foot part 5a on the filler ring 5 to be thin as shown in FIG. 15 from the viewpoint of its strength and the expansion force at the time of holding the same. Consequently, it is better to shorten the foot part 5a and to form the inclined surface 5c in a straight line, as shown in FIG. 16. Incidently, FIGS. 13 and 14 show examples of rings 5 in which a part of the foot part 5a is reserved.

Figure 17:
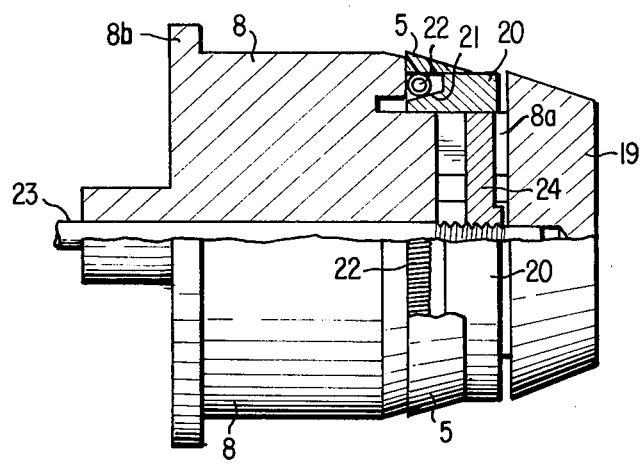
FIG. 17 is an example of another core mold showing its upper half in section.
Figure 18:
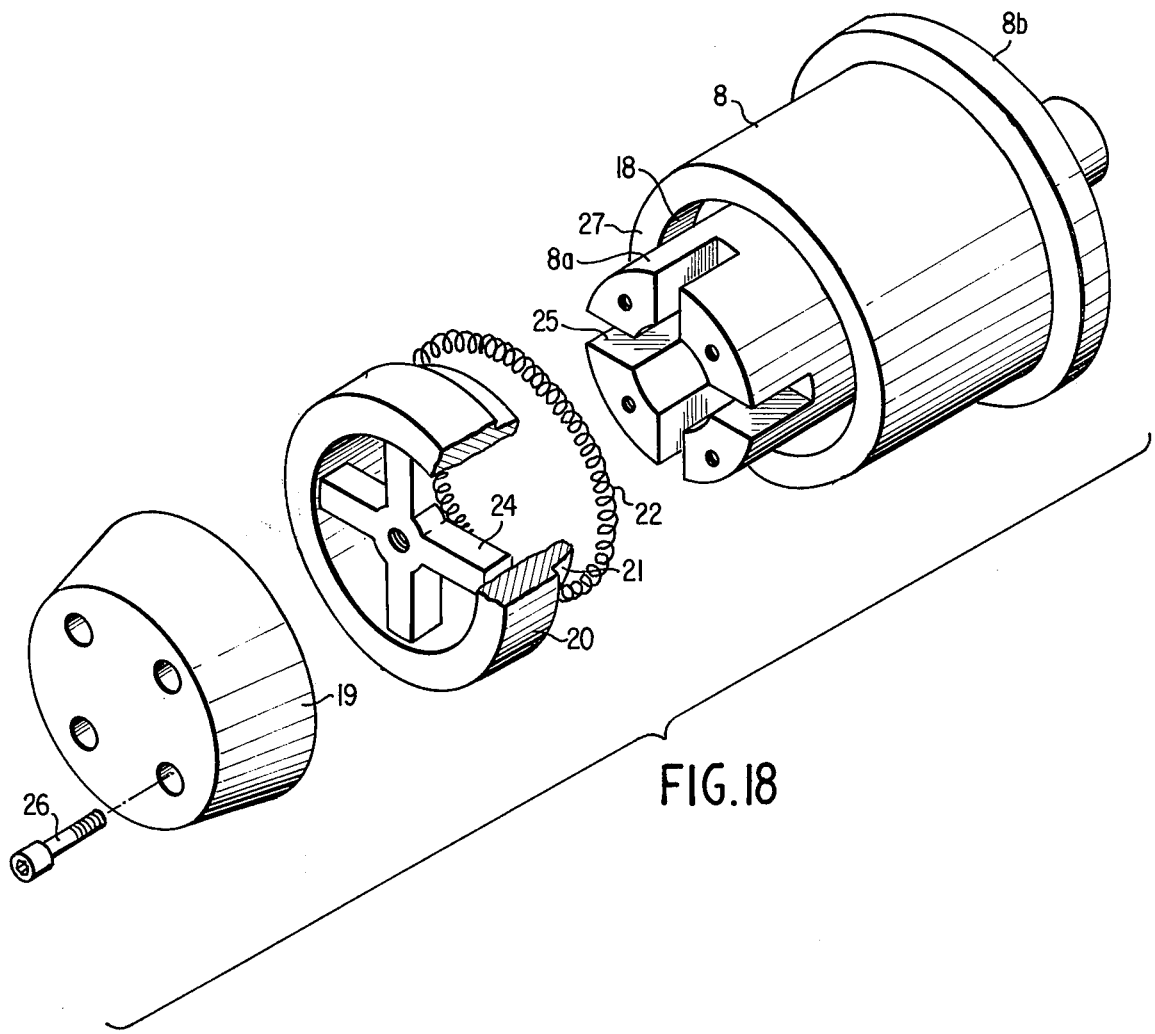
FIG. 18 is an exploded view showing the construction of the mold of FIG. 17.

FIGS. 17 and 18 show another example where the core mold is formed of the socket-molding trunk part 8 and the flange part 8b in the same way as in the foregoing example, but the guide trunk part 8a for the pipe 1, which is to be formed to have the socket part, is formed on the external circumferential surface thereof with a slide ring 20. This slide ring 20 forms an inclined surface 21 extending in the direction of the forming trunk part 8, and its tip part is provided so as to engage in a groove 18 which is formed in a hitching step face 28 at the front of the trunk part 8. 8a is the guide trunk part, but is not a trunk which directly contacts the pipe. It serves as a base for the aforementioned slide ring 20 and is formed integrally with the core mold. In this guide trunk part 8a is formed a cross-slit 25, in which is engaged an X-shaped arm 24 fixed to ring 20 for the purpose of supporting the slide ring 20. In the center of the arm 24 is formed a threaded hole into which is inserted a screw shaft 23. 19 designates a cap body which is attached to the front of the guide trunk part 8a with bolts 26. On the inclined surface 21 of the slide ring 20 there is arranged a spring ring 22 which is provided so as to slide over the inclined surface 21 by means of its own contraction tension. Therefore, the spring ring 22 is regulated and kept by the inclined surface 21 in the vicinity of the hitching step face 27 which is formed on the front face of the trunk part 8. The sectional diameter of the spring ring 22 is selected so as to be almost equal to the difference between the tip of the inclined surface 21 formed on the slide ring 20 and the external circumference of the slide ring 20. Accordingly, as shown in FIG. 17, the external periphery spring ring 22 is almost aligned with the top of the slide ring 20 when it is located on the tip side of the inclined surface 21. The filler ring 5 is axially positioned by the hitching step face 27 on the part 8 and rests upon the external circumference of the spring ring 22 and slide ring 20. Then, if the arm 24 is drawn toward the trunk part 8 by turning the screw shaft 23 through some suitable means, the slide ring 20 expands the spring ring 22 through means of the inclined surface 21 in the radial direction so as to hold the filler ring 5 from the inside. Since the present example makes use of the elasticity of the spring ring, the filler ring can be uniformly held through the spring ring 22. The shifting means for the arm 24 is not necessarily restricted to such a screw shaft 23 as shown in the figure. Many other modified means, in which, for example, such as piston and cylinder are adopted, may come to mind so as to be easily put into use. The hitherto mentioned holding means for the filler ring have all required some working members such as the shifting means for the slide shaft 12, the turning means for the screw shaft 23, or other means with a piston or cylinder. But it is practicable to keep the filler ring concentrically disposed on the core mold even without applying one of the above mentioned working members.

Figure 19:
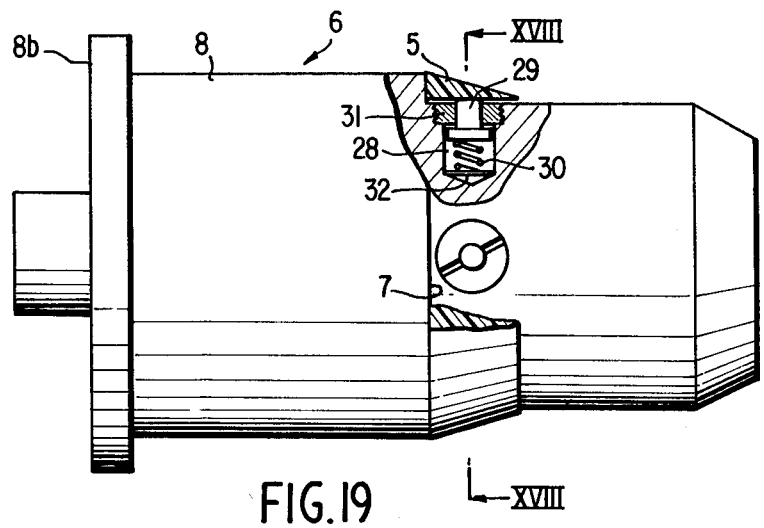
FIG. 19 is an example of still another core mold showing its partially broken away side view.
Figure 20:
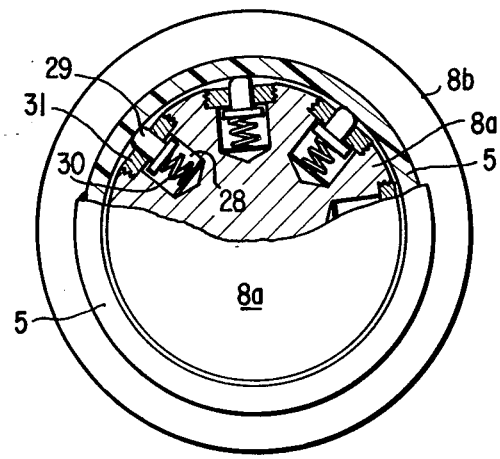
FIG. 20 is a cross-sectional view taken as indicated by the section line XX—XX of FIG. 19.

FIGS. 19 and 20 show a representative example of such. Here is the core mold 6 in which the forming trunk part 8, the flange 8b and the guide trunk part 8a are formed all in one the same as in the foregoing example. Holes 28 are radially provided at places (setting spots of the filler ring 5) near the hitching step face 7 of the guide trunk part 8a (See FIG. 19). The openings of the holes 28 are so formed as to be provided with capped nuts 31. In the holes are housed seat plates 32, coiled springs 30 and thrust members 29. The projections of the thrust members 29 are formed so as to penetrate through the capped nuts 31 and thrust out of the external circumference of the guide trunk part 8a, so that the thrust members 29 are biased at all times radially outwardly by the resilience of the coiled springs 30. Consequently, the filler ring 5 is held by means of the thrust members 29 being biased downward after ring 5 has passed across the guide trunk part 8a. Now the filler ring 5 is in turn expanded in the direction of the external circumference by means of the resilience of the coiled springs 30, and the axial direction of the core mold is maintained by the hitching step face 7. Incidentally, the thrust members 29 are not limited to the example shown in the diagram. It is able to be such that a somewhat ball-formed means is projected out by a spring, or otherwise such may be constructed as to hold the filler ring 5 by utilizing the transverse elasticity of a spring ring which has been arranged in a circumferential groove which was beforehand formed. These examples sufficiently meet the requirements of the present invention in that the top of the filler ring 5 is kept in a position where it protrudes out of the external circumference of the forming trunk part 8. Or else, for the same purpose the resilience of the coiled spring 30 may be preferably constituted so as to be adjustable at will, if required.

Figure 21:
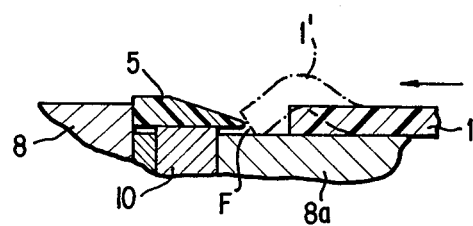
FIG. 21 is a sectional view elucidating the state of an inserted pipe.
Figure 22:
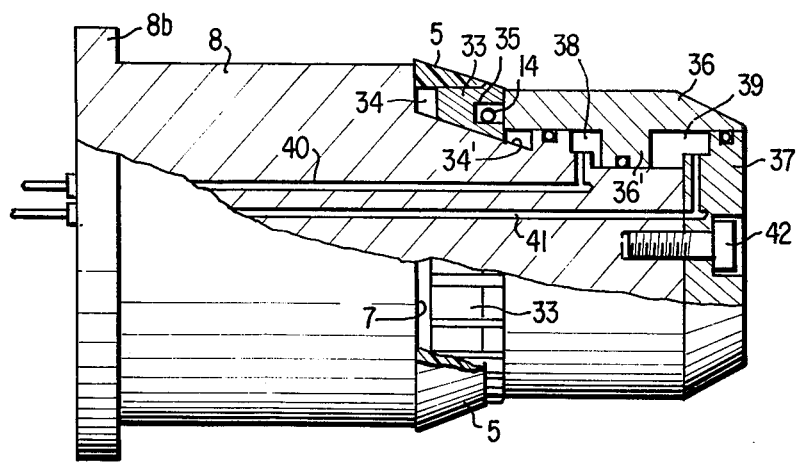
FIG. 22 is a partially broken away sectional view showing another example of the core mold.
Figure 23:
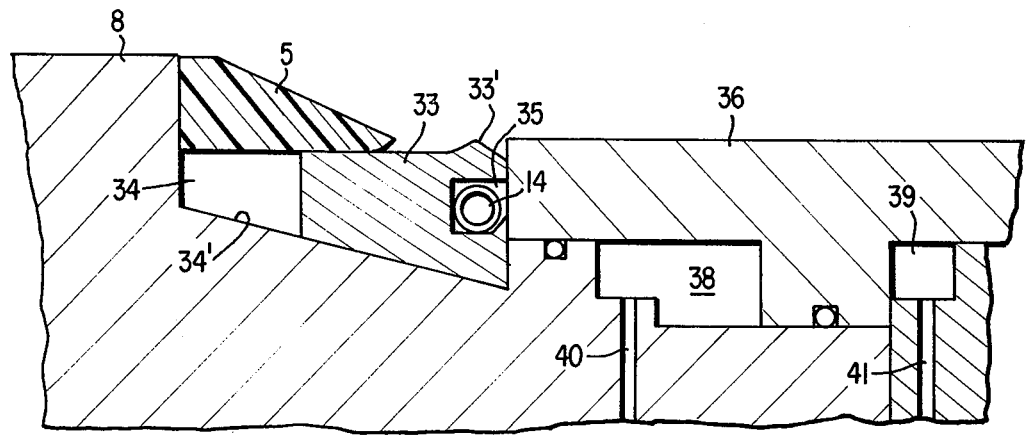
FIG. 23 is a partially enlarged view of FIG. 22.
Figure 24:
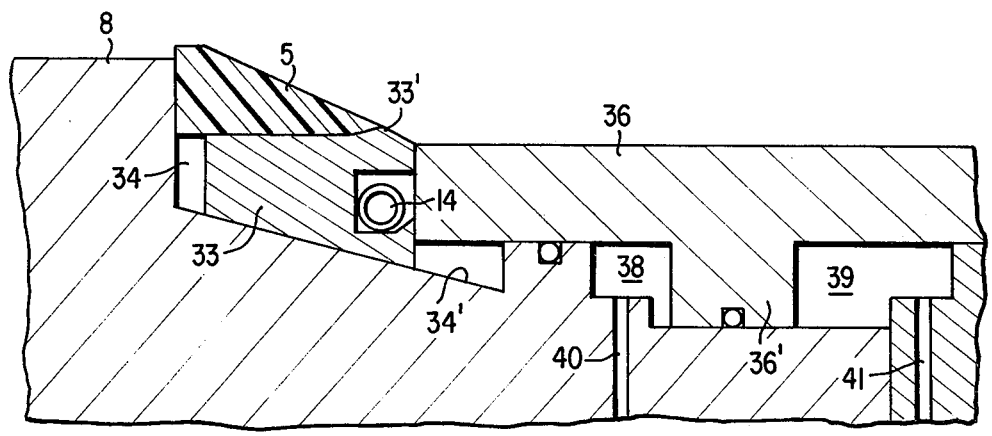
FIG. 24 is a partially enlarged view of FIG. 22 showing particularly another operative state of the apparatus.

In the above-described examples, it has been indeed, noted that the internal diameter of the filler ring 5 is larger than the external diameter of the guide trunk part 8a of the core mold with a view toward the easy setting of the filler ring 5 on the core mold, and that the filler ring 5 is concentrically held by virtue of the holding means. But reference has never been made to the admission process of the pipe 1 which is to be formed. Now referring to this point, the guide trunk part 8a is formed with an external diameter nearly as equal to, or a little larger than, the minimum internal diameter of the pipe 1 which is to be formed. On the other hand, it is impossible to set the filler ring 5 if it does not have an internal diameter as to be able to smoothly pass over the guide trunk part 8a, as described before. Consequently, as shown in FIG. 21, there comes to be created a difference or a gap in the step level F at the tip of the filler ring 5 in relation to the guide trunk part 8a. In the case of a high degree of difference in the step level F, as seen in the diagram, the inserted pipe 1 frequently is checked at its tip by the end part of the filler ring 5 and is swelled up as indicated by the dotted line 1' because of the presence of the flexibility of the pipe 1 which is to be formed, assuming that the pipe 1 has been heat-softened in advance. Generally speaking, when the difference in the step level is small, there is little trouble because the pipe end soon rides on the inclined surface of the filler ring 5, even if it temporarily assumes a shape as indicated by the numeral 1'. However, the trouble such as that shown in FIG. 21 may sometimes occur owing to the eccentricity if the filler ring itself or the lack of uniformity in the internal diameter of the pipe 1 which is to be formed. Avoiding such an undesirable situation, the present invention is so contrived as to include also the provision of a filler-ring holding means on the core mold and at the same time a centering guide means for guidance of the pipe 1 which is to be molded to the correctly concentrical posture. There are two different cases where, on the one hand, this centering guide means is employed jointly with the filler-ring holding member and, on the other hand, it is constructed independently of the filler-ring holding means. FIGS. 22 to 24 show an example in which the centering guide means is incorporated with the filler-ring holding member. Around the external circumference of the filler-ring holding part of the core mold there is, in effect, formed a concave part 34, the bottom of which forms an inclined surface 34' inclining in the forward direction. The guide trunk part of the core mold is formed as a slide ring 36. This slide ring 36 contacts, through means of its inside thrust part 36' the small diametrical part of the front of the core mold, and forms cylinder chambers 38, 39 in conjunction with the small diametrical part of the core mold and with a cap body 37, respectively. These cylinder chambers 38, 39 are communicated with passages 40, 41 and some appropriate pressure medium is introduced thereinto. On the other hand, the aforesaid concave part 34 is arranged with a plurality of slide pieces 33. These slide pieces 33 are each provided with its own retaining part 35 in the same manner as in the foregoing FIG. 11. In this retaining part 35 is arranged a spring ring 14 which biases each slide piece 33 in the central direction. Accordingly, the slide pieces 33 are pressed on the inclined surface 34' by means of the spring ring 14, while they are always biased to slide down along the inclined surface 34' and their front faces are regulated and held by the back side of the slide ring 36. The filler ring 5 is disposed on the external circumference of the slide pieces 33. These slide pieces 33 are also provided with a hill part 33' on the external circumference thereof. The slide ring 36 pushes slide pieces 33 in the direction of the trunk part 8 by introducing a pressure medium into the cylinder chamber 39 through the passage 41, while slide pieces 33 displace in the direction of the extended diameter along the inclined surface 34' so as to hold the filler ring 5. The hill parts 33' which are formed on the external circumference of the slide pieces 33 mate with the notched part formed on the foot part of the filler ring 5, as shown in FIG. 24, and the oblique side of the filler ring 5 falls almost in line with the inclined surface of the hill parts 33'. Consequently, such troubles as those indicated in FIG. 21 are all dissolved, the pipe 1 which is to be formed is smoothly guided in the inclined surface of the filler ring 5 and this is concentrically arranged within the socket part. The present example was exclusively indicative of a means for holding the filler ring 5 by displacement of the slide pieces 33 in the radial direction with the aid of the positive movement of the slide ring 36. But it will be fully understood from the above explanation that there may be expected to be possible to construct another means such as to be able to displace the slide pieces 33 in the radial direction by shifting the slide ring 36 with the help of the inserting friction of the pipe which is to be formed. In order to materialize this idea, it is only necessary to obviate the pressure medium.

Figure 27:
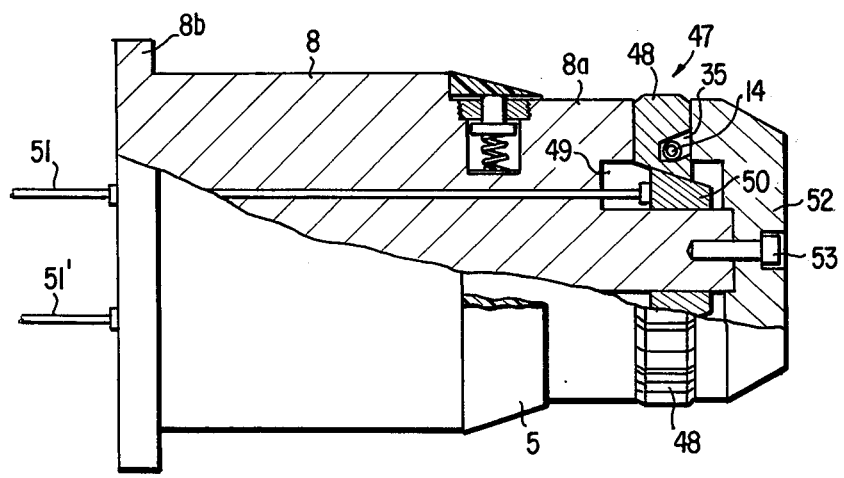
FIG. 27 is a partially broken away sectional side view when a centering guide means for the inserted pipe is employed in the core mold shown in FIG. 19.
Figure 28:
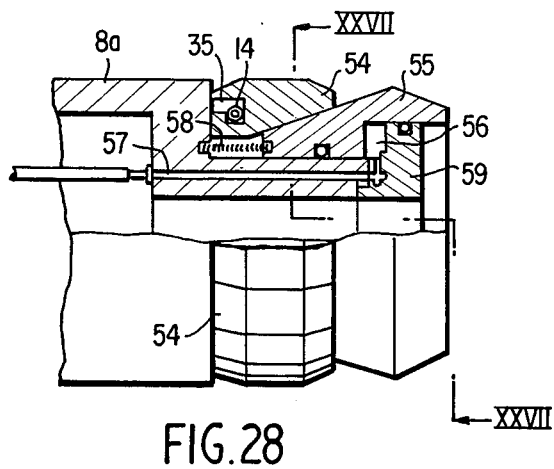
FIG. 28 is a partially borken away sectional side view showing another example of the centering guide means.
Figure 29:
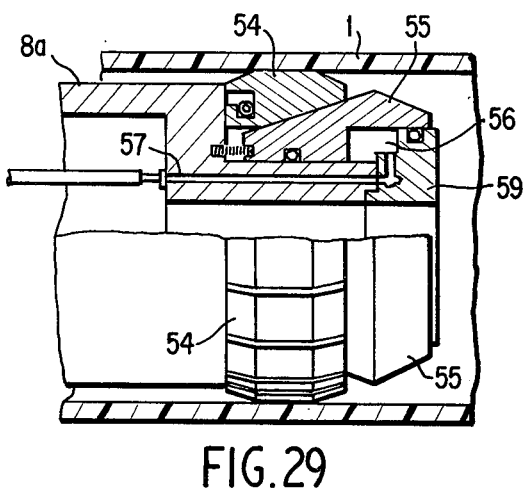
FIG. 29 is a view of the apparatus of FIG. 28 in another operative state.
Figure 30:
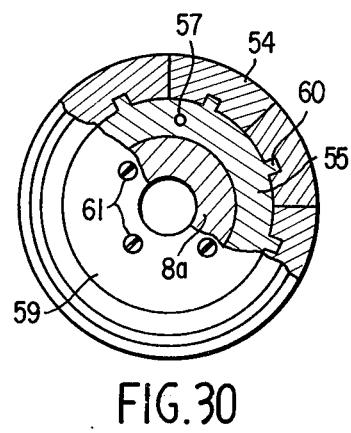
FIG. 30 is a partially broken away cross-sectional view taken as indicated by the section line XXX—XXX on FIG. 28.
Figure 31:
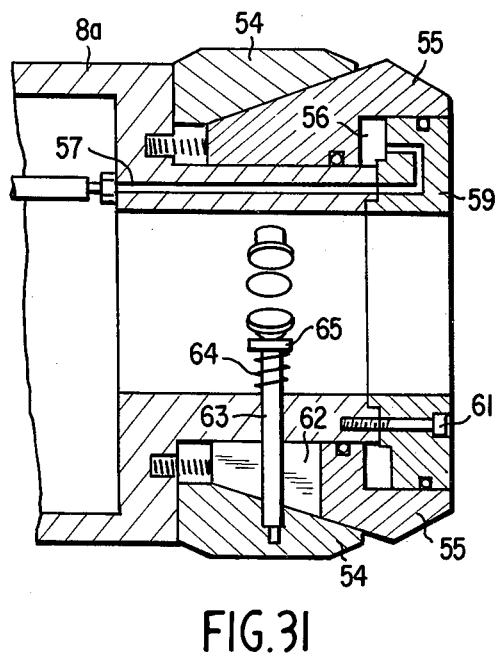
FIG. 31 is a sectional view showing a further example of a centering guide means.
Figure 32:
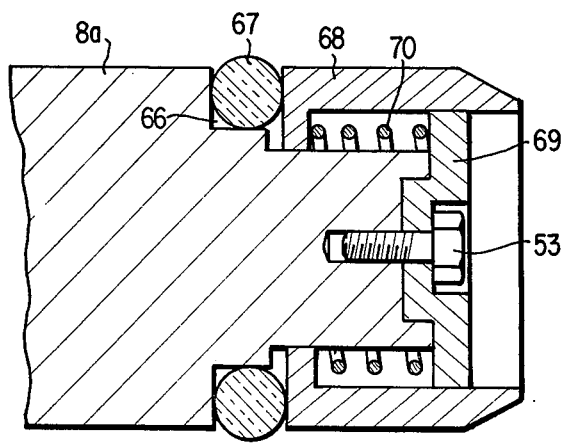
FIG. 32 is a sectional view showing still a further example of a centering guide means.

Attention is now directed to another construction of a centering guide means which is provided jointly with the core mold, but in an independent form from the filler-ring holding means. FIGS. 27 to 35 illustrate a variety of such means. FIG. 27 is an example in which a centering guide means 47 is set jointly in the core mold which was explained using the preceding embodiment of FIG. 19. Namely, the centering guide means 47 is constructed in such a manner as follows: at the front part of the guide trunk part 8a of the core mold is formed a notched step part while leaving a protruding part of small diameter projecting forwardly. In the step part is formed a concavity 49. Around the protruding part is slidably arranged an annular conical drum 50. A plurality of thrust pieces 48 are arranged on the circumferential surface of the drum 50. For retaining the thrust pieces 48 there is formed a retaining part 35 similar to the hitherto mentioned slide pieces. In this retaining part 35 is placed a spring ring 14 which presses each thrust piece 48 against the drum 50. The numeral 52 designates a cap body which is fixed to the protruding part of small diameter with a setting bolt 53, and of which the lateral side facing the trunk part is a sliding surface for mating with the thrust pieces 48. To the drum 50 are connected coupling rods 51, 51' which are provided so as to penetrate through the core mold. The rods 51, 51' are formed so as to be movable by some suitable means (not shown in the figure). As the rods 51, 51' slide, the drum slides. With this sliding the thrust pieces 48 slide in the radial direction and are held at such position. FIG. 28 is another example of the centering guide means. Elevating pieces 54 are converged by the spring ring 14 in the same manner as the thrust pieces in the foregoing example, and are supported on the inclined surface of the slide ring 55. This slide ring 55 is provided so as to be able to slide along the protruding part of small diameter which is formed in the core mold. This sliding movement is executed by the introduction of a pressure medium into a cylinder chamber 56 which is constituted by the cap body 59 and a cavity that is formed in the underside of ring 55. The numeral 57 designates a passage for the pressure medium. The passage is communicated through the cap body 59 with the cylinder chamber 56. 58 is a spring ring which biases the slide ring 55 in the direction away from the guide trunk part 8a at all times. Relating to such a condition, FIG. 28 shows the state in which the elevating piece 54 is drawn in the central direction. But when pressure medium is introduced into the cylinder chamber 56, as shown in FIG. 29, the slide ring 55 shifts toward the guide trunk part 8a side. This movement causes the elevating pieces 54 to move radially outwardly to guide the pipe 1 concentrically. If necessary, axially extending protrusions 60 are provided on the inclined surface of the slide ring 55 such that the elevating pieces 54 may move therealong in a guided manner. The numeral 61 indicates setting bolts of the cap body 59. As for the elevating pieces there are shown here one example of such kind such that they are converged by the spring ring 14 and biased in the central direction. Of course, species of the holding means are not limited only to this kind. Each elevating piece 54 may be arranged so as to be biased in the central direction, as shown in FIG. 31 for one example. Here, the construction of the elevating pieces 54 and the slide ring 55 is the same as in the foregoing example, but the elevating pieces 55 here are maintained by supporting rods 63 which are provided in penetrating slits 62 radially formed in the slide ring 55 from within the small-diameter protruding part of the core mold. Each of the supporting rods 63 is fixed in the elevating pieces 54 at one end thereof, and the other end is provided with a flange part 65. Between the flange parts 65 of the supporting rods 63 and the inside of the small-diameter protruding part of the core mold there are provided coiled springs 64 so as to always bias the supporting rods 63 in the central direction of the core mold and to bias the elevating pieces 54 in the central direction whereby the elevating pieces 54 can be held in response to the shifting of the slide ring 55. FIG. 32 shows another kind of construction of the centering guide means, which uniformly guides the pipe 1 over the guide trunk part 8a by utilizing the deformation of an elastically deforming member, without employing slide pieces. That is, at the front part of the guide trunk part 8a there is formed a step part 66, where a ring made up of elastic material is placed. As the elastic ring 67, there is used one such that the sectional area of the same does not cause the upper face to protrude above the circumferential surface of the guide trunk part 8a under the normal conditions, but owing to the pressure deformation a part of its circumferential surface does protrude beyond the guide trunk part 8a. In a pressure feed means for the elastic ring shown in the figure there is arranged a compressing ring 68 on the circumference of the small-diameter protruding part formed on the core mold. This compressing ring 68 has a planar impinging surface in contact with the elastic ring 67 and its inward side forms a flange part. Against this flange part is set a coiled spring 70. This coiled spring 70 is incorporated with the object of pushing the compressing rigng 68 toward the elastic ring 67 by the use of a checking lid 69 which is attached to the small-diameter protruding part of the core mold. Thus, the elastic ring 67 is given a desired degree of compression by the adjustment of the setting bolt 53 or by exchanging the spring 70, so that it can guide the internal diametrical surface of the pipe which is to be formed (see FIG. 29) by means of the elastic deformation of the elastic ring, thereby aligning the pipe 1 concentrically with the core mold.

Figure 33:
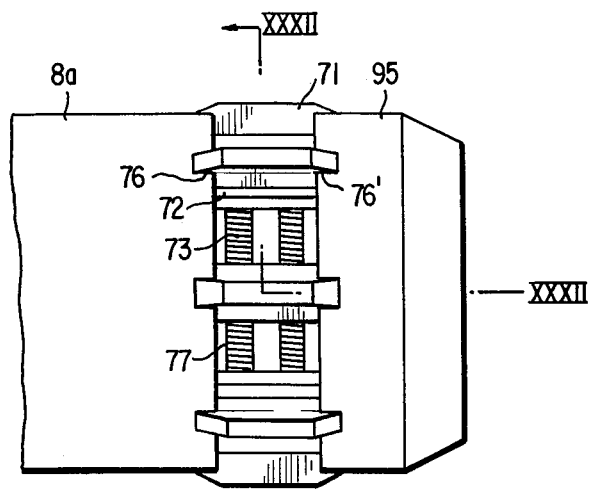
FIG. 33 is a side view showing an even further example of a centering guide means.
Figure 34:
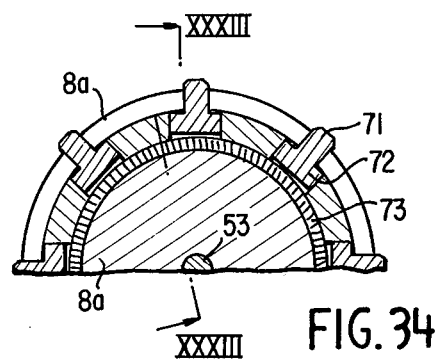
FIG. 34 is a cross-sectional view taken as indicated by the section line XXXIV—XXXIV on FIG. 33.
Figure 35:
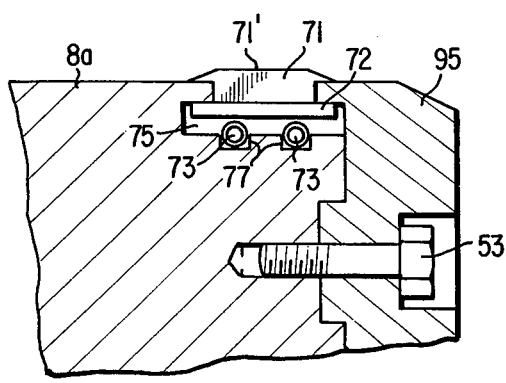
FIG. 35 is a sectional view taken as indicated by the section line XXXV—XXXV on FIG. 34.

There are some centering guide means of the kind that maintain a gap keeping member in a properly spaced-apart relation and are always biased toward the protruding side. FIGS. 33 to 35 show one of those means. Herein, at the front part of the guide trunk part 8a of the core mold is formed a groove 74 or small diametrical part. Along the external circumference of this small diametrical part is formed a notched part 75 upon the trunk part 8a side. In this part 75 is formed a plurality of slits 76 at almost regular intervals on the circumferential surface thereof. On the other hand, on a cap body 95 which forms a part of the guide trunk part 8a there are also formed slits 76' corresponding to the above stated slits 76 formed on the trunk part 8a. On the external circumference of the small diametrical part of the trunk part 8a are two circumferential grooves 77, 77, in which elastic rings 73, 73 are placed. Thrust members 71 consist of, as shown in FIG. 35, thrust wall parts 71' and seat parts 72 equivalent in length to the thrust wall parts. Both ends of these seat parts 72 are inserted in the insides of the notched part 75 and of the cap body 95, and both ends of the thrust walls are fixed into the slits 76,76' to be supported therein. The seat parts 72 are supported on the top face of the elastic rings 73, 73. Both ends of the seat parts 72 are regulated through the elastic deformation of the elastic rings 73, 73 on the inside of the flanges of both the notched part 75 and of the cap body 95. Consequently, when the pipe 1 which is to be formed is pushed in, it is centered so as to impinge upon each thrust member 71 with a uniform thrust. Incidently, the elastic rings 73,73 are continuous elastic bands, however, it is admissible to use spring rings or several independent coiled springs. Furthermore, except for the illustrated embodiments, various kinds of suitable centering guide means are, of course, available, for example, one that utilizes flat springs or thrust members as shown in FIG. 19.

Figure 25:
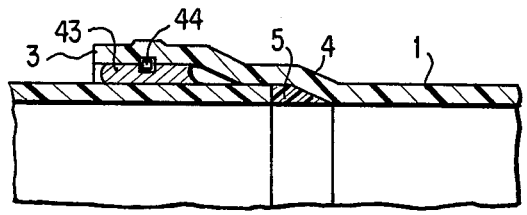
FIG. 25 is a partially sectional view of apparatus providing a retaining ring for the resilient packing on the socket part.
Figure 26:
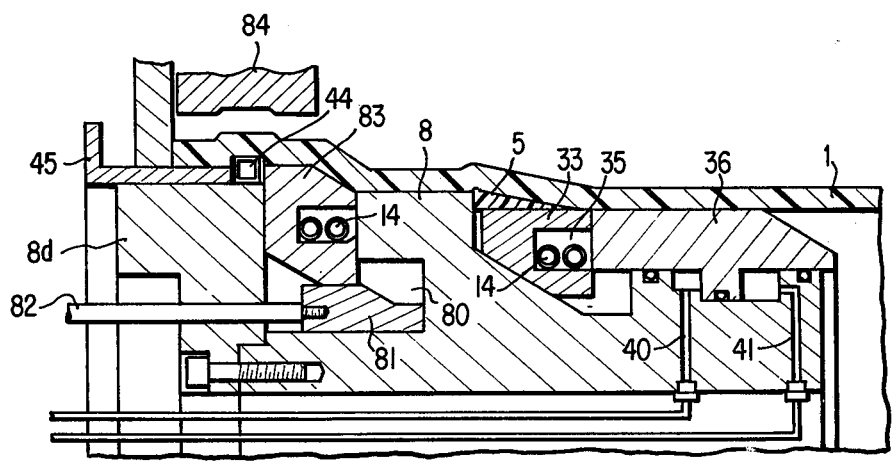
FIG. 26 is a partially sectional view of the core mold for use in the formation of the socket part such as that shown in FIG. 25.

The present invention relates to a core mold including a means for holding a filler ring and is also applicable to a case where a certain kind of member, which is to be incorporated in the socket part, for example, such as a ring for retaining an elastic packing, can be arranged jointly with the filler ring synchronously at the time of the formation of the socket part. In FIGS. 25 and 26 is shown an example for such means. Depending on the species of the socket part, there is a case in which between the formed part of the socket and the pipe 3 which is interconnected thereto there is prepared a clearance where sometimes a rubber packing 43 is applied. But the fixation of the rubber packing 43 on the socket part is very unstable. For the purpose of preventing such a deficiency, a groove (not shown in the figure) is formed for the insertion of the rubber packing 43 in the socket part, or a ring 44 for retaining it is embedded as shown in FIG. 25. As the retaining ring 44, there is generally used a hollow ring of square section which is made up of metal, and particularly of stainless steel. The retaining ring 44 must be correctly placed in the socket part 3 and more importantly is to be arranged in such a manner as to be partly embedded into the pipe. Further, the filler ring 5 and the retaining ring 44 should maintain a special positional relation with each other. In forming such a socket part, the holding means for the filler ring preferably serves as the retaining means at the same time. The retaining ring 44, however, is so small that it is hard to maintain its roughness and flatness. Consequently, in order to hold it correctly on the core mold, it requires a special means, even for keeping it in flatness as well, as a suppporting drum 8d. Further, when the filler ring 5 attached to the socket part 3 is arranged very closely to the retaining ring 44 for the packing, it offers no problem if the slide pieces 33 shown in FIG. 24 perform an additional function of stably holding the retaining ring for the packing 44. But when there is a considerable distance between the retaining ring 44 arranged on the socket part 3 and the filler ring 5, as shown in FIG. 25, it is necessary to contrive a different means. FIG. 26 shows collectively these forming core molds partly in section of their middle upper part, where the holding means for the filler ring 5 is the same as that used in FIG. 22, and the retaining ring 44 is constructed in a different manner. In the figure the socket part has also been fully formed. The back end of the forming trunk part 8 of the core forms a notched part, where a concave groove 80 is formed. In the core part within the concave groove 80 is slidably arranged a cam ring 81. On the circumferential surface of this cam ring 81 there are arranged a plurality of slide pieces 83, as in the formerly mentioned example, being converged centrally by a spring ring. 8d is the supporting drum which forms a part of the core mold. This supporting drum 8d forms a base for the arrangement of the retaining ring 44 in roundness, and is attached to the trunk part 8 of the core mold. On the circumferential surface of the supporting drum 8d there is provided a holding barrel 45 for the retaining ring 44 which is constructed so as to be slidable and is connected to a driving means (not shown in the figure). As for the cam ring 81 supporting the slide piece 83, it is connected to the driving means (not shown in the figure) by a plurality of rods 82 penetrating the supporting drum 8d. The numeral 85 indicates a stopper, and 84 shows an outer mold. Their working and function will now be explained. The filler ring 5 is loaded in the state in which the slide pieces 33 drop, and is held as a result of the shift of the slide ring 36. The retaining ring 44 is arranged on the supporting drum 8d on the opposite side of the trunk part 8 as that side upon which the ring 5 is disposed in the state in which the slide pieces 83 go down. Then the cam ring 81 moves the slide pieces 83 upwardly, as shown in the figure. The holding barrel 45 for the retaining ring 44 moves forward so as to impinge the retaining ring 44 against the slide pieces 83 and to hold them there. At that time the top face of the retaining ring projects above the top of both the holding barrel 45 and the slide pieces 83. Maintaining this state, the pipe 1 which is to be formed, is inserted, and first rides over the filler ring 5, as above mentioned, and being extended along the inclined surface of the slide pieces 83, further moves on the climbs over the retaining ring 44, and lastly is checked by the stopper 85. Then the outer mold 84 shifts toward the core mold and works on the retaining ring so that the ring comes to be embedded in position. After the completion of the formation, the pipe which has been finished is hardened by natural cooling or by positively inducing the same to be cooled.

As fully understood from the hitherto stated description, the present invention is so contrived that the filler ring for use in being set in the socket part may be made slightly larger in its maximum external diameter than the internal diameter of the socket part which is to be formed, and that the filler ring can be concentrically arranged within the socket part which is to be formed, as being held through the medium of a centering holding means on the core mold, and, if necessary, using jointly a centering guide means for the inserted pipe, so that a portion of the external circumferential edge of the filler ring is formed as being uniformly embedded in the pipe thickness of the formed pipe in order to securely retain the filler ring therein, without fear of the same breaking away therefrom.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of molding a socket part on a first synethetic resinous pipe end wherein a socket part for use in the connection of pipes is molded within one end of said first synethetic resinous pipe, while a filler ring, which fills up a clearance produced between the socket part and an end of a second synthetic resinous pipe inserted in the socket part of said first synthetic resinous pipe, serves in the capacity of stopper to regulate the insertion extent of said second synthetic resinous pipe such that said filler ring is loaded at the same time of the formation of the socket part, comprising the steps of:

loading a filler ring, having an external diameter slightly larger than the internal diameter of said socket part which is to be molded, on a core mold including a second wall surface which is built in a member constituting the external circumferential surface of said core mold;

holding said filler ring on a holding means provided on said core mold for expanding said filler ring radially from therewithin;

inserting a heat softened end of said first synthetic resinous pipe over said core mold and filler ring which is thereby held concentrically and in correct roundness to mold said socket part and to embed said filler ring on the inner surface of said first synthetic resinous pipe; and, removing said core mold while retaining said filler ring within said socket part after the completion of the molding such that said filler ring is arranged between said socket part and said inserted end of said second synthetic resinous pipe wherein said holding means for said filler ring supports said filler ring through the medium both of a shifting member arranged movably on the circumferential surface in the axial direction of said core mold and of a spring ring arranged on the inclined surface of said shifting member, thereby holding said filler ring by the expansion of said spring ring in proportion to the movement of said shifting member.

2. A method of molding a socket part on a first synthetic resinous pipe end wherein a socket part for use in the connection of pipes is molded within one end of said first synthetic resinous pipe, while a filler ring, which fills up a clearance produced between the socket part and an end of a second synthetic resinous pipe inserted in the socket part of said first synthetic resinous pipe, serves in the capacity of a stopper to regulate the insertion extent of said second synthetic resinous pipe such that said filler ring is loaded at the same time of the formation of the socket part, comprising the steps of:

loading a filler ring, having an external diameter slightly larger than the internal diameter of said socket part which is to be molded, on a core mold including a second wall surface which is built in a member constituting the external circumferential surface of said core mold;

holding said filler ring on a holding means provided on said core mold for expanding said filler ring radially from therewithin;

inserting a heat softened end of said first synthetic resinous pipe over said core mold and filler ring which is thereby held concentrically and in correct roundness to mold said socket part and to embed said filler ring on the inner surface of said first synthetic resinous pipe; and, removing said core mold while retaining said filler ring within said socket part after the completion of the molding such that said filler ring is arranged between said socket part and said inserted end of said second synthetic resinous pipe wherein said holding means for said filler ring is provided with a plurality of thrust members biased by springs in the protruding direction on the circumference of said core mold where said filler ring is to be arranged, whereby said thrust members expansively hold said filler ring.

3. A method of molding a socket part on a first synthetic resinous pipe end wherein a socket part for use in the connection of pipes is molded within one end of said first synthetic resinous pipe, while a filler ring, which fills up a clearance produced between the socket part and an end of a second synthetic resinous pipe inserted in the socket part of said first synthetic resinous pipe, serves in the capacity of a stopper to regulate the insertion extent of said second synthetic resinous pipe such that said filler ring is loaded at the same time of the formation of the socket part, comprising the steps of:

loading a filler ring, having an external diameter slightly larger than the internal diameter of said socket part which is to be molded, on a core mold including a second wall surface which is built in a member constituting the external circumferential surface of said core mold;

holding said filler ring on a holding means provided on said core mold for expanding said filler ring radially from therewithin;

inserting a heat softened end of said first synthetic resinous pipe over said core mold and filler ring which is thereby held concentrically and in correct roundness to mold said socket part and to embed said filler ring on the inner surface of said first synthetic resinous pipe; and, removing said core mold while retaining said filler ring within said socket part after the completion of the molding such that said filler ring is arranged between said socket part and said inserted end of said second synthetic resinous pipe wherein said holding means for said filler ring is constructed in such a manner that said filler ring can be held by a plurality of slide pieces provided both along a concave step part which is formed in the circumference of said core mold and along the inclined surface which is formed in said concave step part, and that said slide pieces will be able to hold said filler ring by being expanded in the centrifugal direction through the aid of a shifting annulus provided on the front of the external circumference of said core mold.

4. A method of molding a socket part on a first synthetic resinous pipe end wherein a socket part for use in the connection of pipes is molded within one end of said first synthetic resinous pipe, while a filler ring, which fills up a clearance produced between the socket part and an end of a second synthetic resinous pipe inserted in the socket part of said first synthetic resinous pipe, serves in the capacity of a stopper to regulate the insertion extent of said second synthetic resinous pipe such that said filler ring is loaded at the same time of the formation of the socket part, comprising the steps of:

loading a filler ring, having an external diameter slightly larger than the internal diameter of said socket part which is to be molded, on a core mold including a stepped wall surface which is built in a member constituting the external circumferential surface of said core mold;

holding said filler ring on a holding means provided on said core mold for expanding said filler ring radially from therewithin;

inserting a heat softened end of said first synthetic resinous pipe over said core mold and filler ring which is thereby held concentrically and in correct roundness to mold said socket part and to embed said filler ring on the inner surface of said first synthetic resinous pipe; and, removing said core mold while retaining said filler ring within said socket part after the completion of the molding such that said filler ring is arranged between said socket part and said inserted end of said second synthetic resinous pipe wherein prior to said step of inserting said end of said first synthetic resinous pipe over said core mold and said step of holding said filler ring concentrically, said first synthetic resinous pipe is concentrically centered and guided in front of the holding means for the filler by guide means and wherein said centering guide means for said first synthetic pipe is constructed so as to support the internal circumference of the inserted pipe by arranging a plurality of members on the top of the core mold so as to be biased to project up at all times.

5. A method of molding a socket part on a first synthetic resinous pipe end wherein a socket part for use in the connection of pipes is molded within one end of said first synthetic resinous pipe, while a filler ring, which fills up a clearance produced between the socket part and an end of a second synthetic resinous pipe inserted in the socket part of said first synthetic resinous pipe, serves in the capacity of a stopper to regulate the insertion extent of said second synthetic resinous pipe such that said filler ring is loaded at the same time of the formation of the socket part, comprising the steps of:

loading a filler ring, having an external diameter slightly larger than the internal diameter of said socket part which is to be molded, on a core mold including a stepped wall surface which is built in a member constituting the external circumferential surface of said core mold;

holding said filler ring on a holding means provided on said core mold for expanding said filler ring radially from therewithin;

inserting a heat softened end of said first synthetic resinous pipe over said core mold and filler ring which is thereby held concentrically and in correct roundness to mold said socket part and to embed said filler ring on the inner surface of said first synthetic resinous pipe; and, removing said core mold while retaining said filler within said socket part after the completion of the molding such that said filler ring is arranged between said socket part and said inserted end of said second synthetic resinous pipe wherein prior to said step of inserting said end of said first synthetic resinous pipe over said core mold and said step of holding said filler ring concentrically, said first synthetic resinous pipe is concentrically centered and guided in front of the holding means for the filler by guide means and wherein said centering guide means for said first synthetic resinous pipe is constructed in such a manner that a plurality of slide pieces are radially arranged so as to be biased by a spring ring in the axial direction of the core mold, while their expansion operation is executed by a ring which expands the respective bases of said slide pieces.

6. A method as set forth in claim 5, wherein said expanding ring is a shifting member forming a part of the external circumference of the core mold, and is shiftable through means of a pressure medium.

7. A method as set forth in claim 6, wherein biasing of said slide pieces in the central direction is accomplished through means of a spring wherein said slide pieces are each attached to supporting rods which are set floatingly in a radial manner in the core mold and wherein said supporting rods are biased in the central direction through respective coiled springs.

8. A method of molding a socket part on a first synthetic resinous pipe end wherein a socket part for use in the connection of pipes is molded within one end of said first synthetic resinous pipe, while a filler ring, which fills up a clearance produced between the socket part of said first synthetic resinous pipe, serves in the capacity of a stopper to regulate the insertion extent of said second synthetic resinous pipe such that said filler ring is loaded at the same time of the formation of the socket part, comprising the steps of:

loading a filler ring, having an external diameter slightly larger than the internal diameter of said socket part which is to be molded, on a core mold including a stepped wall surface which is built in a member constituting the external circumferential surface of said core mold;

holding said filler ring on a holding means provided on said core mold for expanding said filler ring radially from therewithin;

expanding said holding means to shift said filler ring in a radial direction; and inserting a heat softened end of said first synthetic resinous pipe over said core mold and filler ring which is thereby held concentrically and in correct roundness by said expanded holding means to mold said socket part; and, removing said core mold while retaining said filler ring within said socket part after the completion of the molding such that said filler ring is arranged between said socket part and said inserted end of said second synthetic resinous pipe.

9. A method as set forth in claim 8, wherein said holding means for said filler ring is constituted of a plurality of slide members arranged radially on said core mold and of a conical member simultaneously shifting said slide members in the radial direction.

10. A method as set forth in claim 8, wherein at the time the filler ring held concentrically has been inserted into said heat-softened end of said first synthetic resinous pipe and the molding operation is completed, an outer-shape regulating means is applied to the external circumference of the formed socket part prior to the removal of the core mold so as to retain the filler ring within said socket part.

11. A method as set forth in claim 8, wherein said core mold is constructed in such a manner as to jointly provide and hold a retaining ring for a packing arranged in the socket part in the rear of the holding means for the filler ring.

12. A method as set forth in claim 8, wherein prior to said step of inserting said end of said first synthetic resinous pipe over said core mold and said step of holding said filler ring concentrically, said first synthetic resinous pipe is concentrically centered and guided in front of the holding means for the filler ring by guide means.

13. A method as set forth in claim 12, wherein said centering guide means for said first synthetic resinous pipe is constructed in such a manner that an elastic ring is arranged in a concave part of the external circumference of the core mold such that its elastic deformation created by the compression of a compressing annulus may project said ring up above the top of said core mold until said elastic ring reaches the internal circumference of the inserted pipe.

* * * * *